United States Patent
Carr et al.

(10) Patent No.: US 9,765,829 B2
(45) Date of Patent: Sep. 19, 2017

(54) SELECTABLE HEIGHT ACTUATING PISTON

(71) Applicant: Schaeffler Technologies AG & Co. KG, Herzogenaurach (DE)

(72) Inventors: Stephen Carr, Waterford, MI (US); Shaun Tate, Grand Blanc, MI (US); Robert Mallon, Birmingham, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 117 days.

(21) Appl. No.: 14/802,261

(22) Filed: Jul. 17, 2015

(65) Prior Publication Data

US 2017/0016491 A1    Jan. 19, 2017

(51) Int. Cl.
*F16D 25/08* (2006.01)
*F16D 25/12* (2006.01)
*F16D 13/52* (2006.01)

(52) U.S. Cl.
CPC .......... *F16D 25/082* (2013.01); *F16D 13/52* (2013.01); *F16D 25/126* (2013.01); *F16D 25/083* (2013.01)

(58) Field of Classification Search
CPC .... F16H 25/061; F16H 25/06; F16H 25/0638; F16H 25/12; F16D 25/061; F16D 25/06; F16D 25/0638; F16D 25/12; F16D 25/126; F16D 25/083; F16D 25/082
See application file for complete search history.

(56) References Cited

U.S. PATENT DOCUMENTS

| | | | | |
|---|---|---|---|---|
| 3,444,971 | A * | 5/1969 | Davidson | F16D 25/082 192/85.49 |
| 3,684,069 | A * | 8/1972 | Pray | F16D 25/082 192/110 B |
| 5,106,348 | A * | 4/1992 | Koivunen | F16D 25/02 192/48.614 |
| 5,603,396 | A * | 2/1997 | Murata | F16D 25/02 192/48.614 |
| 6,315,096 | B1 * | 11/2001 | Dairokuno | F16D 25/02 192/35 |
| 2005/0279605 | A1 * | 12/2005 | Sowul | F16D 13/585 192/48.91 |
| 2014/0069763 | A1 * | 3/2014 | Heitzenrater | F16D 23/14 192/66.31 |

* cited by examiner

*Primary Examiner* — Richard Lorence
*Assistant Examiner* — Lillian Nguyen
(74) *Attorney, Agent, or Firm* — Volpe and Koenig, P.C.

(57) ABSTRACT

An actuating piston, and a piston assembly and a disconnect system including the actuating piston are provided. The actuating piston includes an annular backing plate having an axial projection on a first side between an inner radius and an outer radius and an annular piston having a recess between an inner radius and an outer radius. The annular piston is disposed on the annular backing plate so that the axial projection is received in the recess. The actuating piston is selected from a set of actuating pistons, each having a different height based on at least one of the wall thickness of the annular piston being varied or a height of the axial projection being varied, and one of the actuating pistons with a desired height is selected based on an actual height of the friction device.

16 Claims, 3 Drawing Sheets

SELECTABLE HEIGHT ACTUATING PISTON

FIELD OF INVENTION

Embodiments of the present disclosure generally relate to an annular actuating piston, more specifically to an annular piston having an adjustable height.

BACKGROUND

Often, a specific gap or preload is required between an unactuated piston assembly and the elements to be displaced when the piston is actuated. In some applications, for example in a disconnect system, the elements to be moved includes a clutch plate assembly comprising a series of non-friction plates and friction plates with varying tolerances, yielding an unpredictable assembled thickness. The varying tolerances make it desirable to adjust the gap or preload at assembly after the actual thickness of the series of clutch plates is determined. The gap or preload is controlled so that the disconnect system can engage in a controlled manner.

Some current disconnect systems include a shim that is placed in the piston assembly, for example between the piston face and the race of a thrust bearing to control the gap or preload between the piston assembly and the clutch plate assembly. The shim thickness is selected based on the particular clutch plate assembly thickness to maintain a specific gap or preload, or gap or preload range. The shim is an extra, loose component that adds no additional value to the disconnect system.

Accordingly, a need exists for an actuating piston with a selectable height to provide a specific gap or preload, or gap or preload range.

SUMMARY

Embodiments of a selectable height actuating piston, and a piston assembly and a disconnect system using the selectable piston are provided herein. In some embodiments, an actuating piston comprises an annular backing plate having an axial projection on a first side between an inner radius and an outer radius, and an annular piston having a recess between an inner radius and an outer radius. The recess includes an inner circumferential wall, an outer circumferential wall, and a radial wall. The annular piston is disposed on the annular backing plate so that the axial projection is received in the recess. The actuating piston is selected from a set of actuating pistons, each having a different height based on at least one of the wall thickness of the annular piston being varied or a height of the axial projection being varied, and one of the actuating pistons with a desired height is selected based on an actual height of the friction device.

In some embodiments, an actuating piston assembly comprises an actuating piston comprising an annular backing plate having an axial projection on a first side between an inner radius and an outer radius. The assembly further comprises an annular piston selected from a set of annular pistons, each annular piston of the set having a recess having an inner circumferential wall, an outer circumferential wall, and a radial wall, the recess formed between an inner radius and an outer radius. The radial wall of each annular piston of the set has a different wall thickness. The annular piston is disposed on the annular backing plate so that the axial projection is received in the recess. This provides a set of actuating pistons of different heights that can selected based on an actual height of the friction device. In addition or alternatively, a set of annular backing plates manufactured with different heights for the axial projection can be provided, also providing a set of actuating pistons with incremental changes in height. A thrust bearing abuts the radial wall.

In some embodiments, a disconnect system comprises a friction device comprising a plurality of axially stacked clutch plates. An actuating piston assembly is axially disposed proximate to the friction device, the actuating piston comprising an annular backing plate. An annular piston is provided having a recess with an inner circumferential wall, and outer circumferential wall, and a radial wall, the radial wall having a thickness. The recess is formed between an inner radius and an outer radius. The annular piston is disposed on the annular backing plate so that the axial projection is received in the recess. A first axial side of the thrust bearing abuts the radial wall. Here, a plurality of the actuating pistons are provided having different axial heights based on at least one of the wall thickness of the annular piston being varied or a height of the axial projection being varied, and one of the actuating pistons with a desired height is selected based on an actual height of the friction device.

Other and further embodiments of the present invention are described below.

BRIEF DESCRIPTION OF THE DRAWINGS

Embodiments of the present invention, briefly summarized above and discussed in greater detail below, can be understood by reference to the illustrative embodiments of the invention depicted in the appended drawings. It is to be noted, however, that the appended drawings illustrate only typical embodiments of this invention and are therefore not to be considered limiting of its scope, for the invention may admit to other equally effective embodiments.

Figure 1:
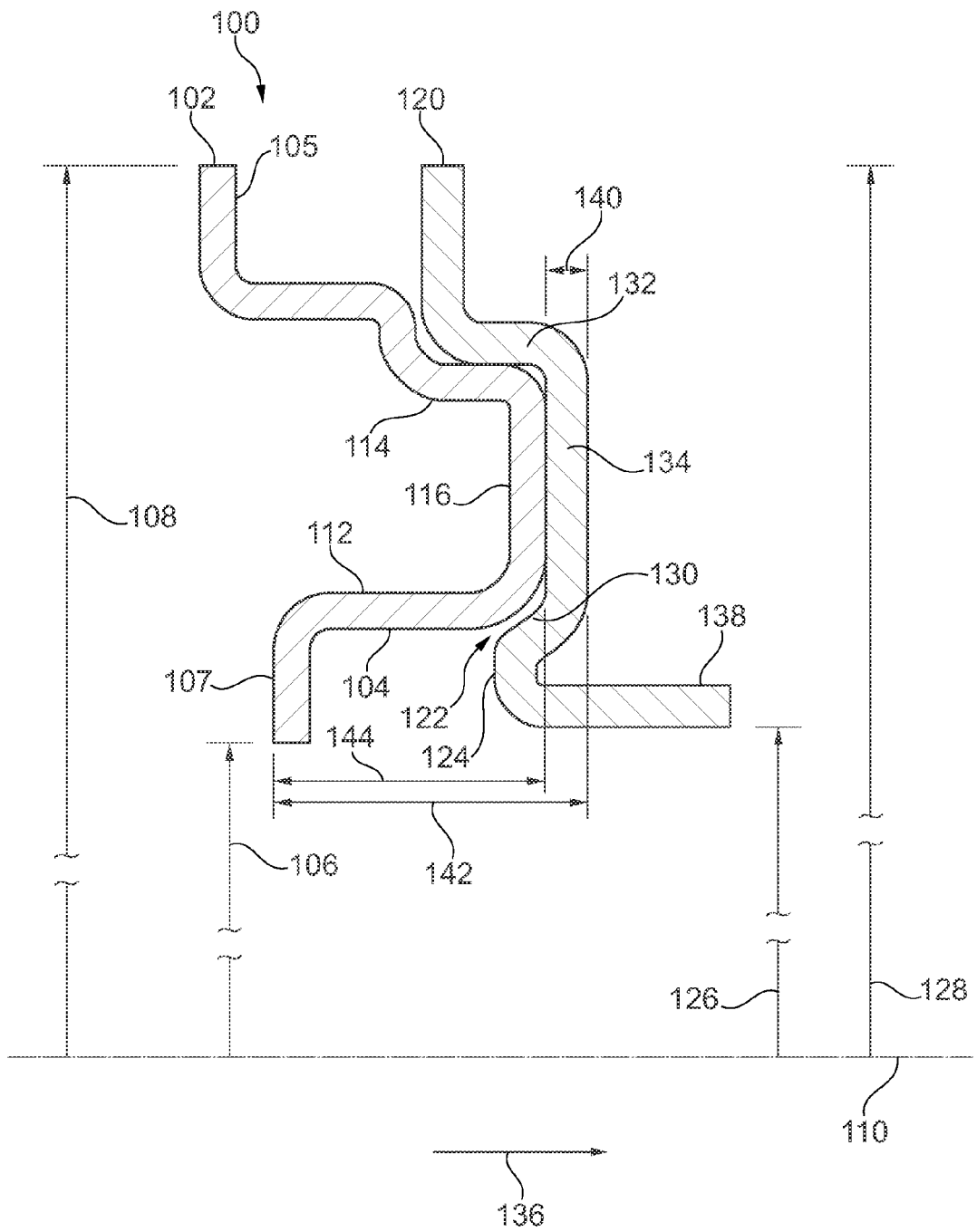
FIG. 1 is a partial side sectional view of an actuating piston in accordance with an embodiment.

To facilitate understanding, identical reference numerals have been used, where possible, to designate identical elements that are common in the figures. The figures are not drawn to scale and may be simplified for clarity. It is contemplated that elements and features of one embodiment may be beneficially incorporated in other embodiments without further recitation.

While described in reference to a power disconnect system, the present invention may be modified for a variety of applications while remaining within the spirit and scope of the claimed invention, since the range of the potential applications is great, and because it is intended that the present invention be adaptable to many such variations.

DETAILED DESCRIPTION

Certain terminology is used in the following description for convenience only and is not limiting. The words "front," "rear," "upper" and "lower" designate directions in the drawings to which reference is made. The words "radially inwardly" and "radially outwardly" refer to directions radially toward and away from an axis of the part being referenced. "Axially" refers to a direction along the axis of a shaft or other part. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

FIG. 1 is a side, partial sectional view of a portion of an exemplary actuating piston 100 comprising an annular backing plate 102 and an annular piston 120. The annular backing plate 102 has a projection 104 extending in an axial direction from first side 105, disposed between an inner radius 106 and an outer radius 108 about centerline 110. The projection 104 includes an inner circumferential wall 112, and outer circumferential wall 114, and a radial wall 116 spaced between and connecting the two circumferential walls 112, 114. In an embodiment, the projection 104 is continuous in a circumferential direction. At least a portion of the inner circumferential wall 112 is generally parallel with a portion of the outer circumferential wall 114 with the radial wall 116 generally perpendicular to both circumferential walls 112, 114.

The backing plate 102 may have a cross section that differs from that shown in FIG. 1. The backing plate 102 may be formed using known forming operations, such as, in non-limiting examples, casting, and sintering using powdered metals. In a preferred embodiment, the backing plate is primarily formed in a process that does not remove material, such as stamping or drawing.

The non-limiting embodiment of an annular piston 120 as shown in FIG. 1 includes a recess 122 formed on a first side 124 between an inner radius 126 and an outer radius 128 about centerline 110. The recess 122 includes an inner circumferential wall portion 130, an outer circumferential wall 132, and a radial wall 134. In a preferred embodiment, the recess 122 is continuous in the circumferential direction. The recess 122 is formed to receive the projection 104, and in a preferred embodiment, the projection 104 and the recess 122 form an interference fit. A pilot portion 138 extends axially away from the backing plate 102 at a radially inner portion of the piston 120.

The second side 107 of the backing plate 102 is adapted to be pressurized by a pressure medium, for example hydraulic oil. When the second side 107 is subject to a pressurized pressure medium, the backing plate 102 and the piston 120 are axially displaced as one piece in the direction corresponding with 136.

Figure 2:
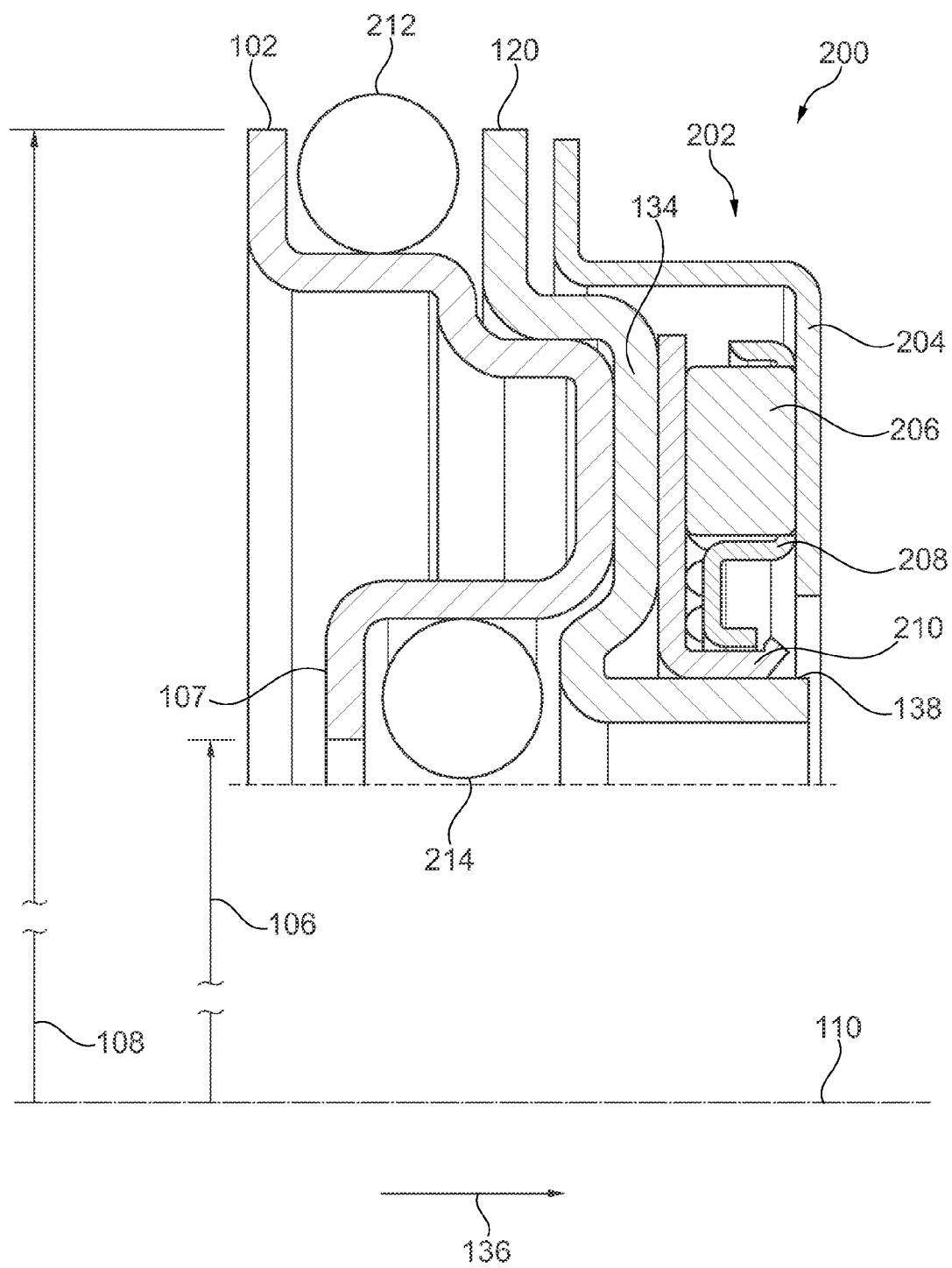
FIG. 2 is a partial side sectional view of an actuating piston assembly in accordance with an embodiment.

FIG. 2 is an exemplary actuating piston assembly 200, comprising some of the same components as the actuating piston 100. As illustrated in FIG. 2, a thrust bearing 202 is disposed abutting a portion of the radial wall 134 opposite the backing plate 102. The thrust bearing includes a first race 204, a rolling element 206 partially contained in a cage 208. As illustrated in the embodiment of FIG. 2, a second race 210 of the thrust bearing 202 is abutting the radial wall 134. In another embodiment, the radial wall 134 provides an adequate bearing surface for the rolling element 206, acting as a second race, obviating the second race 210. Accordingly, second race 210 is optional in an embodiment.

The thrust bearing 202 is supported, or piloted, on a radially outwardly directed portion of the pilot portion 138. In the embodiment of FIG. 2, the second race 210 is supported on the pilot portion 138. In embodiment in which the second race 210 is not used, the radially innermost portion of the cage 208 supports the thrust bearing 202 on the pilot portion 138.

First and second sealing elements 212, 214, for example O-rings, may be included to provide a radial outer seal and a radial inner seal, respectively, at the outer radius 108 and inner radius 106 of the piston assembly 200. Portions of a housing (not shown) may cooperate with the sealing elements 212, 214 to form a pressure seal between the second side 107 of the backing plate and a portion of the first side 104.

Figure 3:
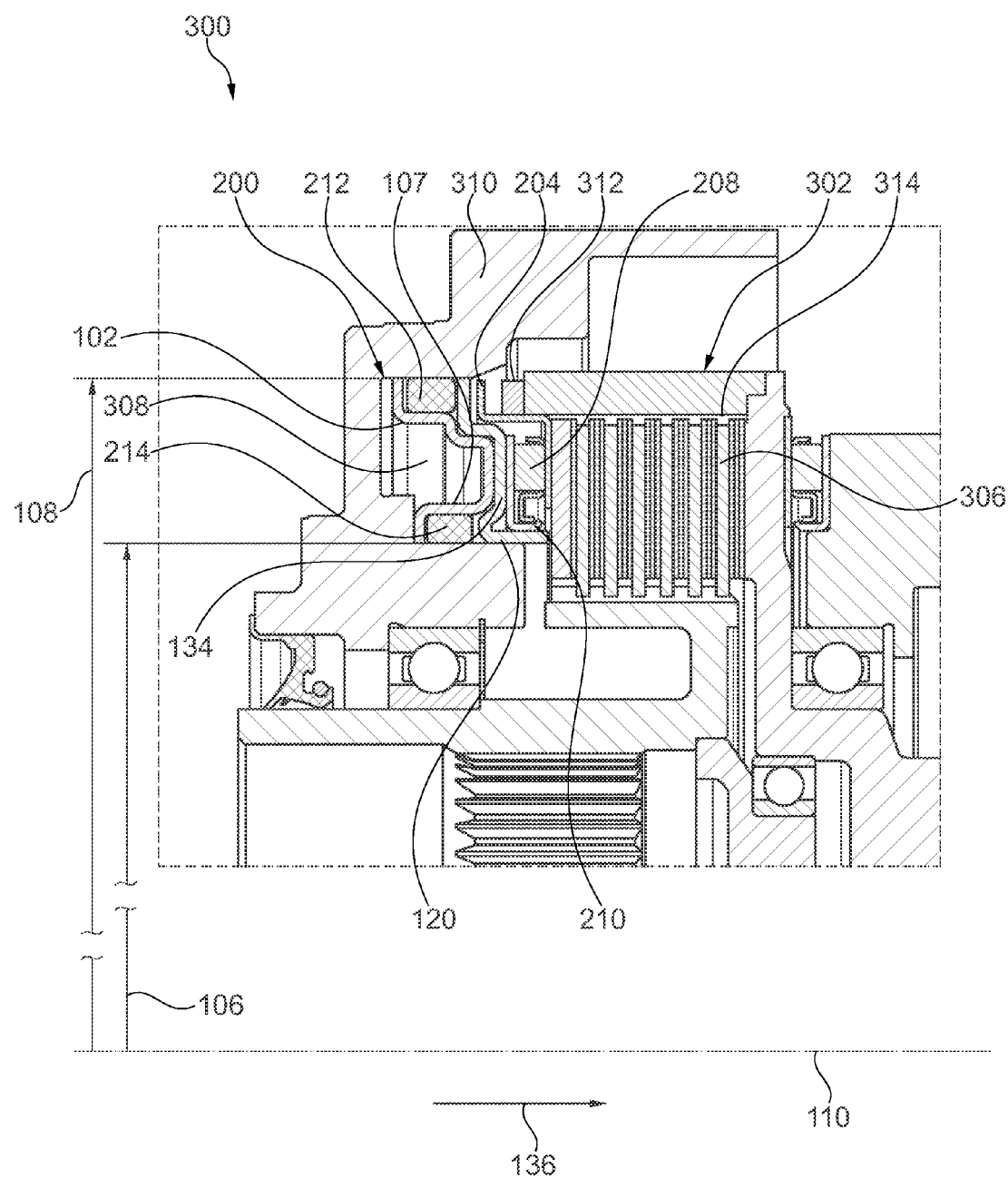
FIG. 3 is a partial side sectional view of a disconnect system including an actuating piston assembly in accordance with an embodiment.

A portion of an exemplary disconnect system 300 is illustrated in FIG. 3 including the actuating piston assembly 200 of FIG. 2. The common elements will not be further described.

In the non-limiting disconnect system 300, the assembly 200 is disposed in a cavity formed within housing 310. The cavity is sized so that the sealing elements 212, 214 are compressed by the cavity walls, providing a seal to maintain the pressure medium in cavity 308.

The disconnect system 300 includes a friction device such as clutch carrier 302 comprising an axial stack of alternating non-friction plates and friction plates 306. When torque transmission is called for, a pressure medium is pressurized in the cavity 308 formed between the housing 310 and the second side 107 of the backing plate 102, urging the backing plate 102 and the piston 120 in the direction of 136. Under the pressure in cavity 308, the first race 204 forces the clutch plates 306 into contact with each other to transfer torque. As the first race 204 advances in direction 136, resilient element 312 is compressed, storing an amount of energy.

When torque transfer is no longer called for, the pressure is reduced in cavity 308 and resilient element 312 returns to its un-compressed state, forcing the first race 204, and the piston 120 and backing plate 102 in a direction opposite of 136.

In the non-torque transfer state illustrated in FIG. 3, a gap exists between the actuating piston assembly 200 and the clutch carrier 302, specifically the gap 314 is between the non-friction plates and the friction plates in clutch carrier 302. The gap 314 must be maintained at a specific distance, or a specific range, to allow proper function of the disconnect system 300. If the gap 314 is too large, the system may not react as quickly as required. If the gap 314 is too small, friction drag can result, causing energy loss and heat buildup. As discussed above, the size of this gap 314 has typically been controlled using a separate shim having a selected thickness that is located between the piston 100 and the thrust bearing 202.

The inventors have found that the gap 314 can be maintained without additional parts by providing an actuating piston 100 configured to have a variable height 142 (measured in the axial direction, i.e., an axial height), as shown in FIG. 1. To achieve this, the present actuating piston 100 can be produced with an annular backing plate 102 with a selected height 144, that is measured, that is combined with an annular piston 120 selected from a set of annular pistons 120, each having a different thickness 140 for the radial wall 134, that is measured in the axial direction, in order to achieve the desired overall height 142 for the actuating piston. Actuating pistons 100 with incremental changes in height, for example height 142=12.950, 13.000, 13.050, 13.100 mm, and so forth, can be produced. At assembly, when the actual height of the friction device is known, the actuating piston 100 with the appropriate height 142 is then selected to provide the desired gap, or gap range. Alternatively, the actuating pistons 100 with the different heights 142 can be provided using generally standard annular backing plates 102 with a known or measured nominal thickness 140 that is combined with annular backing plates 102 manufactured with different heights 144 for the axial projection 104, also providing actuating pistons 100 with incremental changes in height. In a similar manner to that discussed above, at assembly when the actual height of the friction device is known, the actuating piston 100 with the necessary height 142 can be selected and installed to provide the appropriate actuating piston height 142. As a further alternative, depending on how well the tolerances for manufacturing the annular backing plate 102 and the annular piston 120 can be controlled during manufacture, the different heights 142 of the actuating pistons 100 can be achieved and controlled by machining or grinding the face 107 of the annular backing plates 102 or machining or grinding the wall thickness of the radial wall 134. The actuating pistons 100 with the correct array of heights 142 can then be selected from at assembly based on the actual height of the friction device. Through any of the above alternatives, the gap 314 in the friction device, or clutch carrier 302, when the piston 100 is in the non-actuated state, can be properly set.

The thickness of the radial wall 134 and/or the height of the annular backing plate 102 can be varied during manufacturing. For example, the piston 120 may be stamped so that the radial wall 134 has a desired thickness. Alternately, or in addition, the radial wall 134 may be finished by machining or grinding after stamping to yield the desired wall thickness.

Beneficially, in an embodiment, the radial wall 134 of the piston 120 may be used to replace the second race 210, thus eliminating one component and reducing the axial length of the actuating piston assembly 200 and may therefore also reduce the axial length of the disconnect system 300.

Thus an actuating piston, an actuating piston assembly, and a disconnect system including the disconnect assembly are provided herein. The inventive actuating piston may advantageously reduce the number of parts in an assembly and reduces the overall size of a disconnect system. Accordingly, a power transfer system including the piston may be advantageously impacted by reducing the number of parts in the system thereby improving manufacturing cost and ease of assembly, and reducing the axial size of the system.

Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. An actuating piston comprising:
   an annular backing plate having an axial projection on a first side between an inner radius and an outer radius;
   an annular piston having a recess between an inner radius and an outer radius, the annular piston disposed on the annular backing plate so that the axial projection is received in the recess,
   wherein at least one of a wall thickness of the annular piston or a height of the axial projection is based on a measured height of an assembled friction device.

2. The actuating piston of claim 1, wherein the axial projection is continuous in a circumferential direction.

3. The actuating piston of claim 1, wherein the axial projection and the recess form an interference fit.

4. The actuating piston of claim 1, wherein the recess includes an inner circumferential wall, an outer circumferential wall, and a radial wall.

5. The actuating piston of claim 4, wherein a plurality of annular pistons are provided, the radial wall of each said annular piston of the plurality having a different radial wall thickness, wherein the annular piston of the plurality of annular pistons which is installed in the actuating piston includes a wall thickness which is based on the measured height of the assembled friction device.

6. The actuating piston of claim 4, wherein the inner circumferential wall and the outer circumferential wall are formed on the same side of the radial wall to form the recess therebetween.

7. The actuating piston of claim 1, wherein a plurality of annular backing plates are provided, the axial projections of each said annular backing plate having a different axial height, wherein the annular backing plate of the plurality of annular backing plates which is installed in the actuating piston includes an axial projection with an axial height which is based on the measured height of the assembled friction device.

8. The actuating piston of claim 7, wherein the backing plate and the piston move in unison in a first axial direction in response to pressurization of the pressure medium and move in an opposite second axial direction in response to a resilient element.

9. The actuating piston of claim 1, wherein the axial projection is formed by an inner circumferential wall connected to an outer circumferential wall by a radial wall, and wherein the inner circumferential wall and the outer circumferential wall are formed on the same side of the radial wall.

10. An actuating piston assembly, comprising:
    an actuating piston comprising:
      an annular backing plate having an axial projection on a first side between an inner radius and an outer radius;
      an annular piston including a recess having an inner circumferential wall, and outer circumferential wall, and a radial wall, the recess formed between an inner radius and an outer radius, the annular piston is disposed on the annular backing plate so that the axial projection is received in the recess; and
      a thrust bearing abutting the radial wall;
    wherein at least one of a wall thickness of the annular piston or a height of the axial projection is based on a measured height of an assembled friction device.

11. The assembly of claim 10, wherein the piston further includes a pilot portion extending in an axial direction away from the backing plate.

12. The assembly of claim 11, wherein a radially inward portion of the thrust bearing is piloted on the pilot portion.

13. The assembly of claim 11, wherein a portion of the radial wall forms a raceway for the thrust bearing.

14. A disconnect system comprising:
    a friction device comprising a plurality of axially stacked clutch plates;
    an actuating piston axially disposed proximate to the friction device, the actuating piston comprising:
      an annular backing plate having an axial projection on a first side between an inner radius and an outer radius;
      an annular piston including a recess having an inner circumferential wall, and outer circumferential wall, and a radial wall, the radial wall having a thickness, the recess formed between an inner radius and an outer radius, the annular piston is disposed on the annular backing plate so that the axial projection is received in the recess; and a first axial side of a thrust bearing abutting the radial wall, wherein at least one of the wall thickness of the annular piston or a height of the axial projection is based on a measured height of the friction device.

15. The disconnect system of claim 14, wherein a plurality of annular pistons are provided, each of the annular pistons of the plurality including radial walls with different thicknesses, and wherein the annular piston installed in the actuating piston is the one of the plurality of annular pistons which corresponds to a desired height of the actuating piston.

16. The disconnect system of claim 14, wherein a plurality of annular backing plates are provided, each of the annular backing plates including the axial projections with different heights, and wherein the annular backing plate installed in the actuating piston is the one of the plurality of annular backing plates which corresponds to a desired height of the actuating piston.

* * * * *